United States Patent
Akkapeddi et al.

(10) Patent No.: US 11,265,370 B1
(45) Date of Patent: Mar. 1, 2022

(54) MACHINE TO MACHINE (M2M) DATA TRANSFER BETWEEN DATA SERVERS

(71) Applicant: Bank of America Corporation, Charlotte, NC (US)

(72) Inventors: Naga Vamsi Krishna Akkapeddi, Charlotte, NC (US); Siten Sanghvi, Westfield, NJ (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/386,230

(22) Filed: Jul. 27, 2021

(51) Int. Cl.
G06F 15/16 (2006.01)
H04L 67/1021 (2022.01)
H04L 67/1023 (2022.01)
H04L 67/104 (2022.01)

(52) U.S. Cl.
CPC ........ H04L 67/1021 (2013.01); H04L 67/104 (2013.01); H04L 67/1023 (2013.01)

(58) Field of Classification Search
CPC ............ H04L 67/1021; H04L 67/1023; H04L 67/104
USPC ........................................................ 709/217
See application file for complete search history.

(56) References Cited

U.S. PATENT DOCUMENTS

| | | | |
|---|---|---|---|
| 4,694,397 A | | 9/1987 | Grant et al. |
| 5,420,405 A | * | 5/1995 | Chasek ............... G06Q 20/10 235/379 |
| 6,378,775 B2 | | 4/2002 | Hayashida |
| 6,554,184 B1 | * | 4/2003 | Amos ................. G06Q 20/108 235/379 |
| 6,736,314 B2 | * | 5/2004 | Cooper ................ G06Q 20/04 235/375 |
| 7,120,608 B1 | * | 10/2006 | Gallagher .......... G06Q 20/0855 705/68 |

(Continued)

FOREIGN PATENT DOCUMENTS

| | | |
|---|---|---|
| CA | 2371734 C | 11/2007 |
| CN | 105580396 B | 4/2019 |

(Continued)

OTHER PUBLICATIONS

Akkapeddi, N. V, K. et al., "Data Processing Transactions Using Machine To Machine (M2M) Data Transfer," U.S. Appl. No. 17/338,967, filed Jun. 4, 2021, 48 pages.

(Continued)

*Primary Examiner* — Alicia Baturay (57) ABSTRACT

A system includes a first data server storing a first data file for a user and a second data server storing a second data file for the user, wherein a pre-authorized secure connection can be established between the first data server and the second data server. The second data file receives a request for a first amount of data from the second data file and detects that the first amount of data is larger than a second amount of data in the second data file. The second user determines that the first data file at the first data server includes a third amount of data that equals or exceeds a difference between the first amount and the second amount, and receives a fourth amount of data that equals the difference from the first data server over the pre-authorized connection. In response, the second data server processes the request.

20 Claims, 3 Drawing Sheets

(56) References Cited

U.S. PATENT DOCUMENTS

| | | | |
|---|---|---|---|
| 7,258,268 B2 * | 8/2007 | Steiger, Jr. | G06Q 20/4016 235/379 |
| 7,481,359 B2 | 1/2009 | Kawase et al. | |
| 7,783,571 B2 | 8/2010 | Fish et al. | |
| 8,152,054 B2 * | 4/2012 | Bulawa | G06Q 20/102 235/379 |
| 8,204,829 B2 | 6/2012 | Alvarez et al. | |
| 8,271,382 B2 | 9/2012 | Seifert et al. | |
| 8,336,768 B2 * | 12/2012 | Bulawa | G06Q 20/10 235/379 |
| 8,355,988 B2 | 1/2013 | Powell | |
| 8,412,627 B2 * | 4/2013 | Allen-Rouman | G06Q 20/023 705/40 |
| 8,700,412 B2 * | 4/2014 | Hansen | G06Q 20/29 705/39 |
| 8,781,960 B2 * | 7/2014 | Marshall | G06Q 20/10 705/40 |
| 8,851,366 B2 * | 10/2014 | Modi | G06Q 20/10 235/379 |
| 9,477,952 B2 * | 10/2016 | Dutta | G06Q 20/042 |
| 9,697,089 B2 * | 7/2017 | Awazu | G06F 11/1461 |
| 9,747,259 B2 * | 8/2017 | Kapadia | G06F 40/197 |
| 9,892,406 B2 | 2/2018 | Paschini et al. | |
| 9,960,964 B2 * | 5/2018 | Alam | H04L 67/16 |
| 10,311,431 B2 | 6/2019 | Henry | |
| 10,382,926 B2 | 8/2019 | Palanisamy et al. | |
| 10,419,552 B2 * | 9/2019 | Li | H04L 41/0853 |
| 10,558,960 B2 * | 2/2020 | Tulluri | G06Q 20/1085 |
| 10,616,048 B2 * | 4/2020 | Bhalla | H04L 41/0803 |
| 10,631,125 B2 * | 4/2020 | Baek | H04W 4/06 |
| 10,764,252 B2 * | 9/2020 | Bone | H04L 63/20 |
| 10,783,502 B2 * | 9/2020 | Michelsen | G06Q 20/204 |
| 10,904,946 B2 | 1/2021 | Palanisamy et al. | |
| 10,958,552 B2 | 3/2021 | Ly et al. | |
| 10,993,254 B2 * | 4/2021 | Ang | H04W 72/0446 |
| 11,121,989 B1 * | 9/2021 | Castinado | H04L 67/18 |
| 2004/0267666 A1 | 12/2004 | Minami et al. | |
| 2014/0214659 A1 | 7/2014 | Hansen | |
| 2017/0323282 A1 | 11/2017 | Doran et al. | |
| 2017/0364881 A1 | 12/2017 | Meszaros et al. | |
| 2020/0092275 A1 | 3/2020 | Seed et al. | |
| 2020/0294159 A1 | 9/2020 | Throndson et al. | |

FOREIGN PATENT DOCUMENTS

| | | |
|---|---|---|
| CN | 108353262 B | 1/2021 |
| EP | 0200343 B1 | 11/1991 |
| EP | 2945326 B1 | 6/2019 |
| JP | 2020519144 A | 6/2020 |
| KR | 100235531 B1 | 9/1999 |
| KR | 101550062 B1 | 8/2015 |
| KR | 102214073 B1 | 2/2021 |

OTHER PUBLICATIONS

Akkapeddi, N. V, K. et al., "Supporting Data Processing Transactions Using Machine To Machine (M2M) Data Transfer," U.S. Appl. No. 17/339,013, filed Jun. 4, 2021, 47 pages.

* cited by examiner

MACHINE TO MACHINE (M2M) DATA TRANSFER BETWEEN DATA SERVERS

TECHNICAL FIELD

The present disclosure relates generally to data processing, and more specifically to machine to machine (M2M) data transfer between data servers.

BACKGROUND

A data server connected to a network, such as the internet, often allows users that are registered with the data server to store data in one or more data files at the data server and access data stored in the data file over the network. A user may be registered with several data servers located in different geographical regions and may store data files at each of these data servers. In some cases, when the user requests data from a first data file stored at a first data server located in a first geographical region, the first data file may have insufficient data to complete the request. In this case, the first data server may deny the request and/or charge fees to complete the request. The user may have additional data stored in a second data file stored at a second data server in a second geographical region. However, presently data servers cannot access data across data servers to fulfill a data request made at a particular data server.

SUMMARY

The system and methods implemented by the system as disclosed in the present disclosure provide technical solutions to the technical problems discussed above by providing several practical applications for efficient and proactive data transfers between data servers. For example, the disclosed system provides the practical application of processing a request for data from a second data file of a user stored at a second data server by automatically transferring data from a first data file of the user stored at a first data server with little to no user intervention. For example, as described in accordance with embodiments of the present disclosure, when the user requests data from the second data file of the user stored at the second data server, the second data server determines whether the second data file contains sufficient data to fulfill the data request. When the second data server determines that the second data file contains insufficient amount of data to fulfil the data request, the second data server requests the first data server to provide information relating to an amount of data currently held in the first data file of the user stored at the first data server. The user may request the first data server to pre-authorize the second data server for data transfer and link the first data file of the user to the second data file of the user for data transfer from the first data file to the second data file. The pre-authorization may allow the first and second data servers to establish a pre-authorized secure connection between the first data server and the second data server allowing quick transfer of messages and data between first and second data servers. The second data server receives the information relating to the amount of data held in the first data file from the first data server over the pre-authorized secure connection and determines, based on the received information, whether the first data file has sufficient data to cover the difference between the requested data from the second data file and the data currently stored in the second data file. If the first data file is determined to contain sufficient data to cover the difference, the second data server requests and receives additional data from the first data file and processes the data request based at least one the received additional data.

The disclosed system provides an additional practical application of providing efficient access to data for users that are remote from a data server. For example, the disclosed system provides a highly efficient method for providing a user located in a second geographical region access to data stored in a first data server located in a first geographical region outside the second geographical region, by requesting data from a second data server located in the second geographical region, automatically determining whether the second data server has sufficient amount of data to fulfil the data request, transferring additional data from the first data server to the second data server and authenticating the transfer of additional data from the first data server to the second data server using machine to machine (M2M) data transfer between a user device of the user, the first data server and the second data server with little to no human intervention. Using M2M data transfer to provide the data processing services to a user significantly improves the overall processing efficiency of the system.

The disclosed system and methods further improve processing performance of the first data server and the second data server, as well as the network performance of the underlying network connecting the first and second data servers. For example, the first data server pre-authorizes the second data server when a secure and stable connection can be established between the first data server and the second data server. The first and second data servers communicate with each other using the pre-authorized secure connection between them. Using a pre-authorized secure connection for communication between the first data server and the second data server can reduce processing burden on the first and second data servers, and further save network bandwidth used for signaling between the data servers, which would otherwise be necessary to determine whether secure and stable connection can be established between the data servers. The reduced processing burden and saving of network bandwidth improves performance of the first and second data servers, and of the underlying network connecting the data servers.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
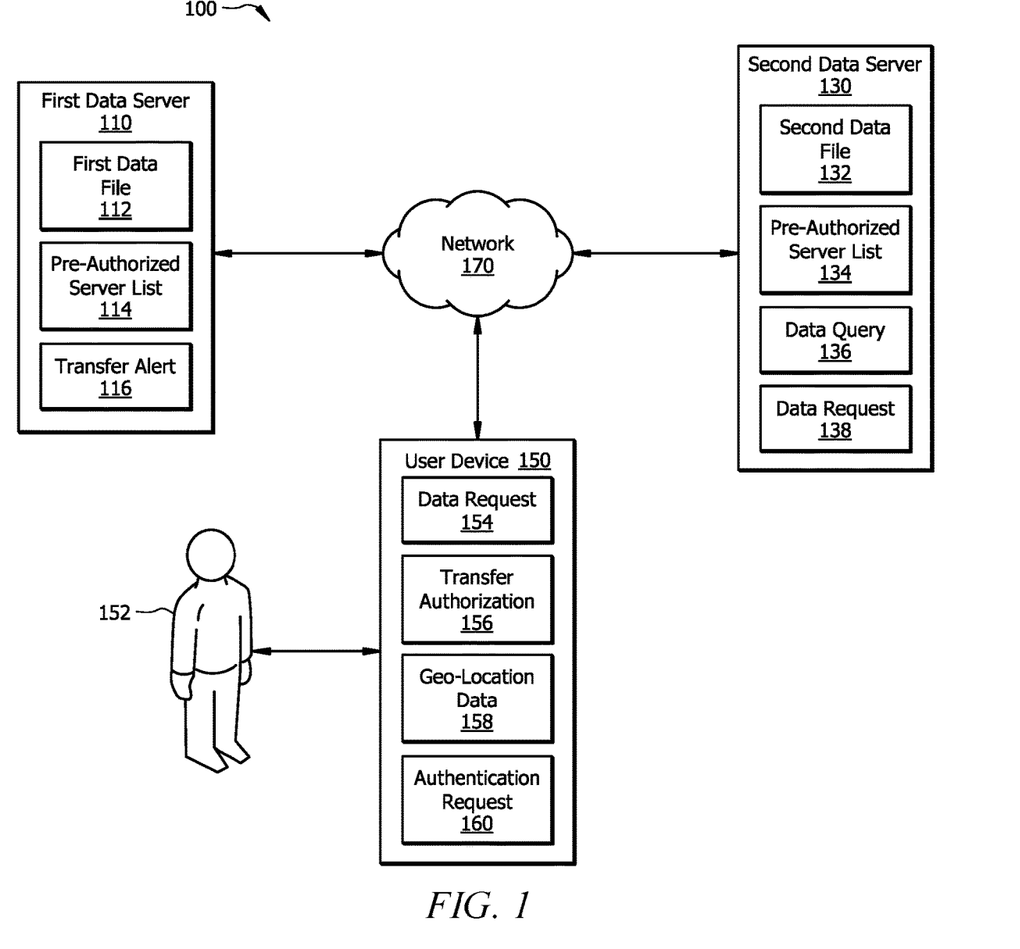
FIG. 1 is a schematic diagram of an example data processing system, in accordance with certain aspects of the present disclosure.

FIG. 1 is a schematic diagram of an example data processing system 100, in accordance with certain aspects of the present disclosure.

As shown in FIG. 1, data processing system 100 may include a first data server 110, a second data server 130 and a user device 150, each connected to a network 170. The network 170, in general, may be a wide area network (WAN), a personal area network (PAN), a cellular network, or any other technology that allows devices to communicate electronically with other devices. In one or more embodiments, the network 170 may be the Internet.

The first data server 110 may be located in a first geographical region and may be configured to provide one or more data processing services to users registered with the second data server 110. For example, a user 152 may be registered with the first data server 110 and may be configured to receive the one or more data processing services provided by the first data server 110. Registered users may access the one or more data processing services provided by the first data server 110 using a user device 150 such as a wearable computing device (e.g., a smart watch), a portable computing device (e.g., smartphone, tablet computer etc.), a laptop computer, a desktop computer or the like.

Similarly, second data server 130 may be located in a second geographical region and may be configured to provide one or more data processing services to users registered with the second data server 130. For example, the user 152 may be registered with the second data server 130 and may be configured to receive the one or more data processing services provided by the second data server 130. Registered users may access the one or more data processing services provided by the second data server 130 using a user device 150 such as a wearable computing device (e.g., a smart watch), a portable computing device (e.g., smartphone, tablet computer etc.), a laptop computer, a desktop computer or the like.

The data processing services provided by the first data server 110 and the second data server 130 may include, but are not limited to, data cloud storage services, software hosting services, media streaming services and banking services.

In one or more embodiments, the first data server 110 may be part of a first computing infrastructure including several data servers (including the first data server 110) connected to the network 170. Similarly, the second data server 130 may be part of a second computing infrastructure including several data servers (including the second data server 130) connected to the network 170. Each of the first and second computing infrastructures may be owned and implemented by an organization including, but not limited to, a software hosting service provider, a media streaming service provider, a cloud services provider, a retail corporation, and a banking corporation. For example, each of the first and second computing infrastructures may be implemented by a cloud data service provider where each of the respective first and second data servers 110 and 130 stores user data and provides access to the stored user data. In one embodiment, the first data server 110 is implemented by a first organization and the second data server 130 is implemented by a second organization that is different from the from organization.

In one embodiment, the first data server 110 may be configured to provide one or more data processing services to users physically located within the first geographical region. In an additional embodiment, the first data server 110 may be configured to provide one or more data processing services to users physically located in one or more geographical regions outside the first geographical region. For example, user 152 may use user device 150 to access one or more data processing services provided by the first data server 110 while physically located in the first and/or second geographical region.

Similarly, the second data server 130 may be configured to provide one or more data processing services to users physically located within the second geographical region. In an additional embodiment, the second data server 130 may be configured to provide one or more data processing services to users physically located in one or more geographical regions outside the second geographical region. For example, user 152 may use user device 150 to access one or more data processing services provided by the second data server 130 while physically located in the first and/or second geographical region.

Each of the first geographical region of the first data server 110 and the second geographical region of the second data server 130 may be representative of a city, state, country, or any other designated geographical region. In one embodiment, the first geographical region of the first data server 110 may be representative of a city, state, country, or any other designated geographical region within which user 152 generally maintains a place of residence and spends most days in a calendar year. On the other hand, the second geographical region of the second data server 130 may be representative of a city, state, country or any other designated region that is outside of the first geographical region. For example, the second geographical region may be a city, state or country that the user 152 may visit temporarily, for example, for business or pleasure. In one embodiment, the first geographical region may be in a first country and the second geographical region may be in a second country In one or more embodiments, user 152 may be registered with the first data server 110 as well as the second data server 130 and may be configured to receive data processing services provided by both the first data server 110 and the second data server 130. For example, the user 152 may be registered with the first data server 110 to store a first data file 112 at the first data server 110, and may also be registered with the second data server 130 to store a second data file 132 at the second data server 130. The registrations with the first and second data servers 110 and 130 allow the user 152 to store data in each of the first and second data files 112 and 132, and to perform one or more data interactions related to the data stored in each of the first and second data files 112 and 132 as supported by the respective first and second data servers 110 and 130. For example, the user 152 may transfer data into and out of each of the first and second data files 112 and 132.

User data stored in each of the first data file 112 and the second data file 132 may include, but is not limited to, personal information related to the user (e.g., user name, age, social security number), user identification data including ID card number, driving license number, user biometrics data (e.g., fingerprints, face recognition pattern etc.), and information related to the respective data file 112 and 132 including a data file name or number and type of access. In one embodiment, user data in each of the first and second data files 112 and 132 may include a number of data objects. For example, the first data file 112 may include a first number of data objects and the second data file 132 may include a second number of data objects. Each data object may be associated with a user credit value, wherein a higher number of data objects in a data file 112 or 132 represents a higher user credit value.

User device 150 of the user 152 may be configured to facilitate and manage data processing interactions with and between each of the first data server 110 and the second data server 130, as described below. A user device 150 may include any device that includes a communication interface for communicating with the first data server 110 and the second data server 130 over the network 170. A user device 150 may additionally include a user interface including for example, a display and a user input means (e.g., keypad, touch screen etc.), to allow user interaction of user 152 with the user device 150. For example, the user device 150 may include, but is not limited to, one or more of a wearable computing device (e.g., a smart watch), a portable computing device (e.g., smartphone, tablet computer etc.), a laptop computer, a desktop computer and the like. User device 150 may communicate with each of the first data server 110 and the second data server 130 over the network 170 using any known wired or wireless technology. The user device 150 may be registered as an authorized device with the first data server 110 as well as the second data server 130. The registration allows user device 150 to perform certain data processing interactions with the first data server 110 and the second data server 130.

In one or more embodiments, each of the first data server 110, the second data server 130 and user device 150 may be implemented by a computing device running one or more software applications. For example, one or more of the first data server 110, the second data server 130 and user device 150 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the first data server 110, the second data server 130 and user device 150 may be representative of a server running one or more software applications to implement respective functionality as described below. In certain embodiments, one or more of the first data server 110, the second data server 130 and user device 150 may run a thin client software application where the processing is directed by the thin client but largely performed by a central entity such as a server (not shown).

The first data server 110 may have a pre-determined association with the second data server 130. For example, the pre-determined association between the first data server 110 and the second data server 130 may include a pre-authorized secure connection that can be established or is already established between the first data server 110 and the second data server 130. In one embodiment, during a pre-authorization phase, the first data server 110 attempts to establish a secure connection with the second data server 130. A secure connection may be established between the first data server 110 and the second data server 130 by exchanging signaling between them. For example, during an initial attempt to communicate with each other, the first data server 110 and the second data server 130 may exchange security credentials (e.g., security certificates) to verify identities of the data servers 110 and 130. The first data server 110 can further check whether data can be reliably exchanged with the second data server 130. The first data server 110 pre-authorizes the second data server 130 when a secure and stable connection can be established between the first data server 110 and the second data server 130. The pre-authorized second data server 130 may then be added to a pre-authorized server list 114. The pre-authorization of the second data server 130 allows data exchange to occur seamlessly between the first data server 110 and the second data server 130 when a data processing interaction (e.g., data transfer between the data servers 110 and 130) is being processed by the data servers 110 and 130. For example, since a secure connection was already established between the first data server 110 and the second data server 130 during the pre-authorization phase, the data servers can skip the initial phase of connection establishment and start exchanging data without delay, thus saving processing resources, network bandwidth and time.

In another example, the pre-determined association may include the second data server 130 pre-authorized by the first data server 110 for communication with the first data server 110. The first data server 110 may pre-authorize the second data server 130 for communication with the first data server 110, when the second data server 130 satisfies a minimum threshold security standard. For example, the first data server 110 may pre-authorize the second data server 130 for communication with the first data server 110, when the second data server 130 implements one or more security measures approved by the first data server 110. The approved one or more security measures may include, but are not limited to, anti-virus software, anti-spyware software, firewalls to block unauthorized access to the second data server 130, intrusion prevention systems, virtual private networks to provide safe and secure remote access to the second data server 130 and other measures to restrict physical access to the second data server 130. By setting a threshold security standard for communicating with the first data server 110 and allowing the second data server 130 to communicate with the first data server 110 when the second data server 130 satisfies the threshold security standard, first data server 110 may save the computing infrastructure of which the first data server may be a part from malicious network attacks and help maintain a high degree of data security.

The pre-authorization phase can be initiated by the user 152 (e.g., via user device 150) at the first data server 110 or the second data server 130. For example, the user 152 may request the first data server 110 to pre-authorize the second data server 130 and add the second data server 130 to the pre-authorized server list 114. In response to receiving the request, the first data server 110 may establish a pre-authorized secure connection with the second data server 130 as described above. When a secure connection is successfully established between the first data server 110 and the second data server 130, the first data server 110 may add the second data server 130 to the pre-authorized server list. Additionally, the user 152 may request that the first data file 112 is linked with the second data file 132 so that data can be exchanged between the first data file 112 and the second data file 132 over a pre-authorized secure connection between the first data server 110 and the second data server 130. The pre-authorized server list 114 may store an identity of the second data file 132 and an identity of the second data server 130 (e.g., Internet Protocol (IP) Address) both mapped to the first data file 112. User 152 may request that the first data file 112 be linked to several data files (including the second data file 132) stored at different data servers located in different geographical regions. Thus, the pre-authorized server list 114 may include a list of data files and respective data servers mapped to the first data file 112, wherein each entry in the pre-authorized server list 114 includes an identity of a different data file and an identity of the corresponding data server storing the data file. Each entry in the pre-authorized server list 114 may also include information relating to the geographical region in which the data server is located. In one embodiment, the user 152 may configure the first data server 110 to transmit data from the first data file 112 to the pre-linked second data file 132, receive data from the pre-linked second data file 132 into the first data file 112, or both.

When the pre-authorization phase is initiated at the second data server 130, to pre-authorize the first data server 110, the second data server 130 may perform similar operations as discussed above with regard to when the pre-authorization of the second data server 130 is requested at the first data server 110. In this case, pre-authorized server list 134 at the second data server 130 may store a list of data servers and corresponding data files stored at those data servers that are linked to the second data file 132. For example, the pre-authorized server list 134 may store an identity of the first data file 112 and an identity of the first data server 110 (e.g., Internet Protocol (IP) Address) both mapped to the second data file 132.

In one example use case, the first data server 110 may be implemented by a first cloud data service provider that allows registered user 152 to store data in the first data file 112 and provides access to the stored data to the user 152. The second data server 130 may be implemented by a second similar cloud data service provider that allows the registered user 152 to store data in the second data file 132 and provides access to the data to the user 152. The first and second cloud data service provides may be partnered with each other such that a pre-authorization associated exists between the first data server 110 and the second data server 130 as described above. The pre-determined association may allow the second data server 130 to receive data stored in the first data file 112 from the first data server 110.

User device 150 may be configured to transmit a data request 154 to the second data server 130 for transferring data from the second data file 132. For example, user 152 may use the user interface of the user device 150 to generate the data request 154. The data request 154 may include a request to transfer a first amount of data from the second data file 132 to a third data file (not shown) also stored at the second data server 130 or stored at a third data server (not shown) connected to the network 170, or to another device connected to the network 170. The first amount of data requested for transfer from the second data file 132 may include a first number of data objects.

The second data server 130 may be configured to receive the data request 154 from the user device 150 and fulfil the data request 154 by transferring the requested first amount of data from the second data file 132 to the requested destination (e.g., another data file or device). However, in some cases, the amount of data stored in the second data file may be insufficient to fulfil the data request 154. That is, the first amount of data requested for transfer from the second data file 132 may be larger than a second amount of data currently stored in the second data file 132. For example, the first number of data objects requested from the second data file 132 may be higher than a second number of data objects stored in the second data file 132. The second data server 130 may be configured to detect when the first amount of data (e.g., first number of data objects) requested (e.g. using the data request 154) from the second data file 132 is larger than the second amount of data (e.g., second number of data objects) currently stored in the second data file 132.

In response to detecting that the first amount of data requested from the second data file 132 is larger than the second amount of data currently stored in the second data file 132, the second data server 130 may be configured to search the pre-authorized server list 134 for one or more other data files of the user 152 that are pre-linked to the second data file 132 and pre-authorized for transferring data to the second data file 132. For example, based on searching the pre-authorized server list 134, the second data server 130 may determine that the first data file 112 of user 152 stored at the first data server 110 is pre-linked to the second data file 132 and pre-authorized to transmit data to the second data file 132. As described above, the pre-authorization may allow the second data server 130 to receive data from the first data file 112 into the second data file 132 over a pre-authorized secure connection between the first data server 110 and the second data server 130.

After determining that the first data file 112 is pre-linked to the second data file 132 for data transfer from the first data file 112 to the second data file 132, the second data server 130 may determine whether the first data file 112 has sufficient data to cover the difference between the first and second amounts of data needed to fulfil the data request 154. In other words, the second data server 130 may be configured to determine whether a third amount of data currently stored in the first data file 112 equals or exceeds the difference between the first amount of data requested for transfer from the second data file 132 and the second amount of data currently stored in the second data file 132. For example, the second data server 130 determines whether a third number of data objects currently stored at the first data file 112 is same as or exceeds the difference between the first and second number of data objects. To make this determination, the second data server 130 may be configured to transmit a data query 136 to the first data server 110 over the pre-authorized secure connection established between the first data server 110 and the second data server 130. The data query 136 may include a request for the first data server 110 to transmit information relating to the third amount data stored in the first data file 112. In response to receiving the data query 136, the first data server 110 may be configured to transmit the information relating to the third amount of data (e.g., third number of data objects) stored in the first data file 112. The second data server 130 may be configured to receive the information relating to the third amount of data and compare the third amount to the difference between the first and second amounts to determine whether the third amount equals or exceeds the difference between the first and second amounts.

If the second data server 130 determines that the third amount of data stored at the first data file 112 equals or exceeds the difference between the first and second amounts, the second data server 130 may be configured to transmit a data request 138 to the first data server 110 over the pre-authorized secure connection to request for transfer of data from the first data file 112 that can over the difference between the first and second amounts and allow the second data server 130 to fulfil the data request 154. For example, the second data server 130 may be configured to include in the data request 138 a request to transmit a fourth amount of data from the first data file 112, wherein the requested fourth amount at least equals the difference between the first and second amounts. The fourth amount of data may correspond to a fourth number of data objects that at least equals the difference between the first and second number of data objects. In response to receiving the data request 138, the first data server 110 may be configured to transmit the requested fourth amount of data from the first data file 112 to the second data server 130 over the pre-authorized connection between the first and second data servers 110 and 130. In one embodiment, upon receiving the data request 138, the first data server 110 may be configured to search the pre-authorized server list 114 to check whether the second data server 130 is a pre-authorized data server and that the first data server 110 is pre-authorized (e.g., by user 152) to transmit data from the first data file 112 to the second data file 132 at the second data server 130. The first data server 110 may be configured to transmit the requested fourth amount of data to the second data server 130 when the second data server 130 is determined as a pre-authorized data server and that the first data server 110 is pre-authorized to transmit data from the first data file 112 to the second data file 132 at the second data server 130. User 152 may configure the fourth amount of data to be equal to the difference between the first and second amounts or higher than the difference between the first and second amounts.

In one or more embodiments, the first data server 110 may be configured to obtain authorization from the user 152 before transferring the fourth amount of data from the first data file 112 to the second data server 130. For example, upon receiving the data request 138 from the second data server 130, the first data server 110 may be configured to send a transfer alert 116 to the registered user device 150. The transfer alert 116 may include an indication that the pre-authorized second data server 130 is requesting the fourth amount of data to be transferred from the first data file 112 to the pre-linked second data file 132. User 152 may authorize the data request 138 by using the user interface of the user device 150. In response to the user 152 authorizing the data request 138 using the user device 150, the user device 150 may be configured to transmit a transfer authorization 156 to the first data server 110 indicating that the data request 138 is authorized. The first data server 110 may transfer the requested fourth amount of data after receiving the transfer authorization 156 from the user device 150.

The second data server 130 may be configured to receive the requested fourth amount of data from the first data server 110 and store the received data in the second data file 132. After receiving the fourth amount of data from the first data server 110, the second data file 132 may have sufficient data to fulfill the data request 154. Accordingly, the second data server 130 may process the data request 154 to transfer the requested first amount of data from the second data file 132 to the requested destination (e.g. another data file or device).

User device 150 may be capable of and configured to detect a geo-location (e.g., GPS coordinates) of the user device 150, and thus, a geo-location of the user wearing the user device 150, carrying the user device 150 or otherwise in the vicinity of the user device 150. User device 150 may be configured to determine a geo-location of the user device 150 according to a pre-determined schedule (e.g., periodically). User device 150 may be configured to regularly send geo-location data 158 (e.g., including the geo-location of the user device 150) to the first data server 110. The first data server 110 may be configured to receive the geo-location data 158 from the user device 150 and determine a geographical location of the user device 150. The first data server 110 may be configured to activate data transfer from the first data file 112 to the second data file 132 in response to detecting that the user device 150 is in the second geographical region of the second data server 130. As long as the user device 150 is not detected in the second geographical region, the first data server 110 may be configured to keep the data transfer from the first data file 112 to the second data file 132 inactive. This may significantly reduce the probability of potential data breaches at the first data server 110 and improve data security of the first data server 110.

In one or more embodiments, the second data server 130 may require the user 152 to maintain a minimum amount of data (e.g., minimum number of data objects) in the second data file 132 to maintain privileged status of the user 152 and/or avoid additional fees to the user 152. Accordingly, the second data server 130 may be configured to detect when the amount of data in the second data file 132 (second amount of data from the above discussion) falls below a pre-selected threshold data amount (e.g., threshold number of data objects) needed, for example, to maintain the privileged status and/or avoid additional fees to the user 152. In response to determining that the second amount of data in the second data file 132 is below the threshold amount, the second data server 130 may be configured to determine an amount of data needed to bring the second data file 132 to the threshold amount of data. For example, the second data server 130 may be configured to determine a fifth amount of data (e.g., fifth number of data objects) as a difference between the threshold amount and the second amount currently stored in the second data file 132. The second data server 130 may be configured to request the first data server 110 to transfer the fifth amount of data from the first data file 112 to the second data server 130. The second data server 130 may request the fifth amount of data similar to how the second data server 130 requests the fourth amount of data from the first data server 110 as described above, including obtaining the third amount of data currently stored in the first data file 112, determining whether the third amount of data equals or exceeds the fifth amount of data needed to bring the second data file 132 up to the threshold amount, and requesting the fifth amount of data upon determining that the third amount of data in the first data file 112 equals or exceeds the fifth amount of data. The second data server 130 may be configured to receive the requested fifth amount of data from the first data server 110 and store in the second data file. The storing of the fifth amount of data to the second data file 132 may bring the second data file 132 up to the threshold amount, thus avoiding loss of privileged status of the user 152 and/or avoid additional fees to the user 152.

The user device 150 may be configured to authenticate the data processing interactions requested by the user 152 for processing at the first data server 110 and/or second data server 130. For example, the user device 150 may be configured to authenticate the data request 154 generated at the user device 150. To authenticate a data processing interaction (e.g., data request 154), the user device 150 may be configured to verify an identify of the user 152 requesting the data processing interaction using the user device 150, so that an authorized user can initiate the data interaction. For example, the first data server 110 and/or the second data server 130 may allow the owner of the data files 112 and 132 alone to initiate the data processing interaction. In this case, user device 150 verifies that the user 152 requesting the data interaction using the user device 150 is the owner of the data files 112 and 132. To accomplish the verifying, user device 150 may be configured to prompt the user 152 to provide a unique personal identifier of the user. In response, user device 150 may receive the unique personal identifier of the user 152. The unique personal identifier of the user 152 may include, but is not limited to, a personal identification number (PIN) assigned to the user by the first data server 110 and/or the second data server 130, a government ID card number, driving license number, user biometrics data (e.g., fingerprints, face recognition pattern, etc.), voice pattern and combinations thereof. The user 152 may provide the unique personal identifier using the user interface of the user device 150. The unique personal identifier of the user may be stored locally at the user device 150. In this case, the user device 150 may compare the received personal identifier to the stored personal identifier of the user 152. User device 150 may determine that the requested data interaction is successfully authenticated in response to a successful match between the received and stored personal identifiers. In an alternative embodiment, the first data server 110 and/or the second data server 130 may store one or more pre-verified unique personal identifiers for the user 152. In this case, user device 150 may transmit an authentication request 160 along with the data request 154 to the second data server 110 to authenticate the data request 154, wherein the authentication request 160 includes the personal identifier obtained by the user device 150 from the user 152 requesting the data interaction. Upon receiving the authentication request 160, second data server 130 compares the personal identifier received in the authentication request 160 to a respective personal identifier of the user 152 stored at the second data server 130. If the personal identifiers match, second data server 130 determines that the requested data interaction (e.g., data request 154) is authenticated and transmits an indication of successful authentication to the user device 150.

In an example banking use case, the first data server 110 may be representative of a first banking server of a first bank located in a first country. The second data server 130 may be representative of a second banking server of a second bank located in a second country. The first data file 112 may be representative of a first bank account of the user 152 at the first bank in the first country and the second data file 132 may be representative of a second bank account of the user 152 at the second bank in the second country. In this example use case, the user 152 may configure the first bank account at the first bank to provide protection to the second bank account at the second bank from being debited in excess of the funds held in the second bank account. This configuring may correspond to the pre-authorization of the second bank account by the first bank (or vice versa) and setting up of a pre-authorized secure connection between the first bank server and the second bank server for quickly exchanging messages and funds between the first and second bank servers. When user 152 requests an amount of funds (first amount of data described above) to be transferred (including funds withdrawal) from the second bank account, the second bank server determines whether the second bank account has sufficient funds (second amount of data described above) to fulfil the request. The funds request may correspond to the data request 154 described above. When the second bank server determines that the second bank account does not contain sufficient funds to fulfil the funds request, the second bank server contacts the first bank server of the first bank to request information relating to a an amount of funds (third amount of data described above) currently held in the first bank account of the user 152. The second bank server receives information relating to the amount of funds held in the first bank account and determines whether this amount equals or exceeds the difference between the requested funds from the second bank account and the funds currently held in the second bank account. If the second bank server determines that determines the amount held in the first bank account equals or exceeds the difference between the requested funds from the second bank account and the funds currently held in the second bank account, the second bank server requests the first bank server to transfer funds (fourth amount of data described above) from the first bank account that at least equals the difference between the requested funds from the second bank account and the funds currently held in the second bank account. The second data server may then process the original request for transfer of funds from the second bank account based at least on the additional funds received from the first bank account. This method provides seamless and quick funds transfer between the first bank server and the second bank server using machine to machine (M2M) data transfer between the bank servers with little to no user intervention, allowing use of funds held in user bank accounts across banks located in different countries to fulfil a funds request at one of the banks. This method may further help the user to avoid expensive excess withdrawal fees resulting from the second bank account being debited in excess of the funds held in the second bank account.

It may be noted that to avoid redundancy in descriptions, embodiments of the present disclosure describe certain operations performed by the first data server 110 and certain other operations performed by the second data server 130. However, a person having ordinary skill in the art can appreciate that the first data server 110 and the second data server 130 are interchangeable and that each operation performed by the first data server 110 can be performed by the second data server 130 and vice versa.

Figure 2:
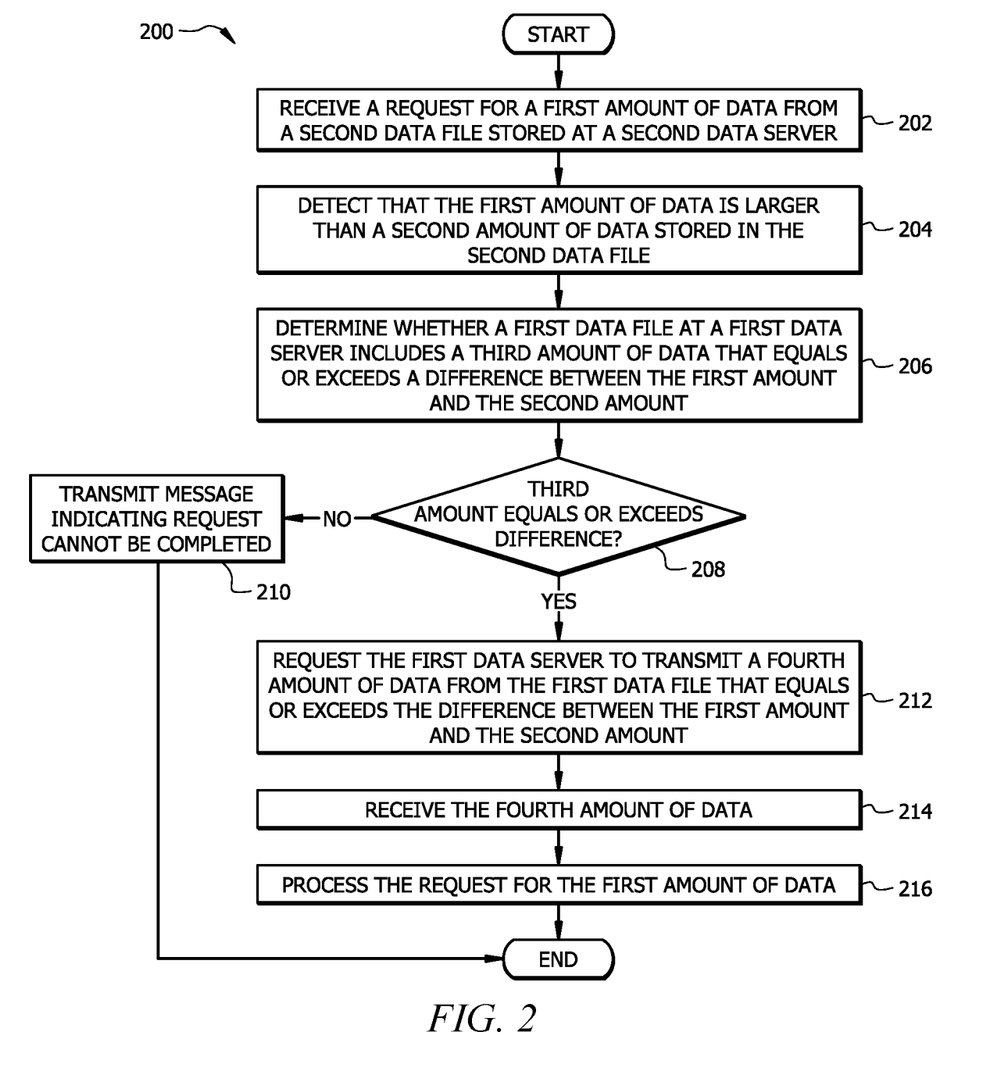
FIG. 2 is a flowchart of an example method for transferring data between data servers, in accordance with certain embodiments of the present disclosure.

FIG. 2 is a flowchart of an example method 200 for transferring data between data servers, in accordance with certain embodiments of the present disclosure. Method 200 may be performed by either one of the first data server 110 and the second data server 130 as shown in FIG. 1 and described above.

At step 202, a second data server 130 receives a request for a first amount of data from a second data file 132 stored at the second data server 130.

As described above, the data processing system 100 may include a first data server 110, a second data server 130 and a user device 150, each connected to a network 170. The first data server 110 may be located in a first geographical region and may be configured to provide one or more data processing services to user 152 registered with the first data server 110. The second data server 130 may be located in a second geographical region and may be configured to provide one or more data processing services to the user 152 also registered with the second data server 130. In one embodiment, the first data server 110 is implemented by a first organization and the second data server 130 is implemented by a second organization that is different from the from organization. The first geographical region may be in a first country and the second geographical region may be in a second country.

The user 152 may be registered with the first data server 110 to store a first data file 112 at the first data server 110, and may also be registered with the second data server 130 to store a second data file 132 at the second data server 130. The registrations with the first and second data servers 110 and 130 allow the user 152 to store data in each of the first and second data files 112 and 132, and to perform one or more data interactions related to the data stored in each of the first and second data files 112 and 132 as supported by the respective first and second data servers 110 and 130. For example, the user 152 may transfer data into and out of each of the first and second data files 112 and 132.

User data stored in each of the first data file 112 and the second data file 132 may include, but is not limited to, personal information related to the user (e.g., user name, age, social security number), user identification data including ID card number, driving license number, user biometrics data (e.g., fingerprints, face recognition pattern etc.), and information related to the respective data file 112 and 132 including a data file name/number and type of access. In one embodiment, user data in each of the first and second data files 112 and 132 may include a number of data objects. For example, the first data file 112 may include a first number of data objects and the second data file 132 may include a second number of data objects. Each data object may be associated with a user credit value, wherein a higher number of data objects in a data file 112 or 132 represents a higher user credit value.

The first data server 110 may have a pre-determined association with the second data server 130. For example, the pre-determined association between the first data server 110 and the second data server 130 may include a pre-authorized secure connection that can be established or is already established between the first data server 110 and the second data server 130. In one embodiment, during a pre-authorization phase, the first data server 110 attempts to establish a secure connection with the second data server 130. A secure connection may be established between the first data server 110 and the second data server 130 by exchanging signaling between them. For example, during an initial attempt to communicate with each other, the first data server 110 and the second data server 130 may exchange security credentials (e.g., security certificates) to verify identities of the data servers 110 and 130. The first data server 110 can further check whether data can be reliably exchanged with the second data server 130. The first data server 110 pre-authorizes the second data server 130 when a secure and stable connection can be established between the first data server 110 and the second data server 130. The pre-authorized second data server 130 may then be added to a pre-authorized server list 114. The pre-authorization of the second data server 130 allows data exchange to occur seamlessly between the first data server 110 and the second data server 130 when a data processing interaction (e.g., data transfer between the data servers 110 and 130) is being processed by the data servers 110 and 130. For example, since a secure connection was already established between the first data server 110 and the second data server 130 during the pre-authorization phase, the data servers 110 and 130 can skip the initial phase of connection establishment and start exchanging data without delay, thus saving processing resources, network bandwidth and time.

In another example, the pre-determined association may include the second data server 130 pre-authorized by the first data server 110 for communication with the first data server 110. The first data server 110 may pre-authorize the second data server 130 for communication with the first data server 110, when the second data server 130 satisfies a minimum threshold security standard. For example, the first data server 110 may pre-authorize the second data server 130 for communication with the first data server 110, when the second data server 130 implements one or more security measures approved by the first data server 110. The approved one or more security measures may include, but are not limited to, anti-virus software, anti-spyware software, firewalls to block unauthorized access to the second data server 130, intrusion prevention systems, virtual private networks to provide safe and secure remote access to the second data server 130 and other measures to restrict physical access to the second data server 130. By setting a threshold security standard for communicating with the first data server 110 and allowing the second data server 130 to communicate with the first data server 110 when the second data server 130 satisfies the threshold security standard, first data server 110 may save the computing infrastructure of which the first data server may be a part from malicious network attacks and help maintain a high degree of data security.

The pre-authorization phase can be initiated by the user 152 (e.g., via user device 150) at the first data server 110 or the second data server 130. For example, the user 152 may request the first data server 110 to pre-authorize the second data server 130 and add the second data server 130 to the pre-authorized server list 114. In response to receiving the request, the first data server 110 may establish a pre-authorized secure connection with the second data server 130 as described above. When a secure connection is successfully established between the first data server 110 and the second data server 130, the first data server 110 may add the second data server 130 to the pre-authorized server list 114. Additionally, the user 152 may request that the first data file 112 is linked with the second data file 132 so that data can be exchanged between the first data file 112 and the second data file 132 over a pre-authorized secure connection between the first data server 110 and the second data server 130. The pre-authorized server list 114 may store an identity of the second data file 132 and an identity of the second data server 130 (e.g., Internet Protocol (IP) Address) both mapped to the first data file 112. User 152 may request that the first data file 112 be linked to several data files (including the second data file 132) stored at different data servers located in different geographical regions. Thus, the pre-authorized server list 114 may include a list of data files and respective data servers mapped to the first data file 112, wherein each entry in the pre-authorized server list 114 includes an identity of a different data file and an identity of the corresponding data server storing the data file. Each entry in the pre-authorized server list 114 may also include information relating to the geographical region in which the data server is located. In one embodiment, the user 152 may configure the first data server 110 to transmit data from the first data file 112 to the pre-linked second data file 132, receive data from the pre-linked second data file 132 into the first data file 112, or both.

When the pre-authorization phase is initiated at the second data server 130 to pre-authorize the first data server 110, the second data server 130 may perform similar operations as discussed above with regard to when the pre-authorization of the second data server 130 is requested at the first data server 110. In this case, pre-authorized server list 134 at the second data server 130 may store a list of data servers and corresponding data files stored at those data servers that are linked to the second data file 132. For example, the pre-authorized server list 134 may store an identity of the first data file 112 and an identity of the first data server 110 (e.g., Internet Protocol (IP) Address) both mapped to the second data file 132.

User device 150 may be configured to transmit a data request 154 to the second data server 130 for transferring data from the second data file 132. For example, user 152 may use the user interface of the user device 150 to generate the data request 154. The data request 154 may include a request to transfer a first amount of data from the second data file 132 to a third data file (not shown) also stored at the second data server 130 or stored at a third data server (not shown) connected to the network 170, or to another device connected to the network 170. The first amount of data requested for transfer from the second data file 132 may include a first number of data objects.

At step 204, the second data server 130 detects that the first amount of data is larger than a second amount of data stored in the second data file.

As described above, the second data server 130 may be configured to receive the data request 154 from the user device 150 and fulfil the data request 154 by transferring the requested first amount of data from the second data file 132 to a requested destination (e.g., another data file or device). However, in some cases, the amount of data stored in the second data file may be insufficient to fulfil the data request 154. That is, the first amount of data requested for transfer from the second data file 132 may be larger than a second amount of data currently stored in the second data file 132. For example, the first number of data objects requested from the second data file 132 may be higher than a second number of data objects stored in the second data file 132. The second data server 130 may be configured to detect when the first amount of data (e.g., first number of data objects) requested (e.g. using the data request 154) from the second data file 132 is larger than the second amount of data (e.g., second number of data objects) currently stored in the second data file 132.

At step 206, the second data server 130 determines over the pre-authorized secure connection with the first data server 110, whether the first data file 112 at the first data server 110 includes a third amount of data that equals or exceeds a difference between the first amount and the second amount.

In response to detecting that the first amount of data requested from the second data file 132 is larger than the second amount of data currently stored in the second data file 132, the second data server 130 may be configured to search the pre-authorized server list 134 for one or more other data files of the user 152 that are pre-linked to the second data file 132 and pre-authorized for transferring data to the second data file 132. For example, based on searching the pre-authorized server list 134, the second data server 130 may determine that the first data file 112 of user 152 stored at the first data server 110 is pre-linked to the second data file 132 and pre-authorized to transmit data to the second data file 132. As described above, the pre-authorization may allow the second data server 130 to receive data from the first data file 112 into the second data file 132 over a pre-authorized secure connection between the first data server 110 and the second data server 130.

After determining that the first data file 112 is pre-linked to the second data file 132 for data transfer from the first data file 112 to the second data file 132, the second data server 130 may determine whether the first data file 112 has sufficient data to cover the difference between the first and second amounts of data needed to fulfil the data request 154. In other words, the second data server 130 may be configured to determine whether a third amount of data currently stored in the first data file 112 equals or exceeds the difference between the first amount of data requested for transfer from the second data file 132 and the second amount of data currently stored in the second data file 132. For example, the second data server 130 determines whether a third number of data objects currently stored at the first data file 112 is same as or exceeds the difference between the first and second number of data objects. To make this determination, the second data server 130 may be configured to transmit a data query 136 to the first data server 110 over the pre-authorized secure connection established between the first data server 110 and the second data server 130. The data query 136 may include a request for the first data server 110 to transmit information relating to the third amount data stored in the first data file 112. In response to receiving the data query 136, the first data server 110 may be configured to transmit the information relating to the third amount of data (e.g., third number of data objects) stored in the first data file 112. The second data server 130 may be configured to receive the information relating to the third amount of data and compare the third amount to the difference between the first and second amounts to determine whether the third amount equals or exceeds the difference between the first and second amounts.

At step 208, if the second data server 130 determines that the third amount of data stored at the first data file 112 does not equal or exceed the difference between the first and second amounts, method 200 proceeds to step 210 where the second data server 130 transmits a message to the user device 150 indicating that the data request 154 cannot be completed.

On the other hand, if and when the second data server 130 determines that the third amount of data stored at the first data file 112 equals or exceeds the difference between the first and second amounts, method 200 proceeds to step 212.

At step 212, the second data server 130 requests the first data server 110 over the pre-authorized connection to transmit a fourth amount of data from the first data file 112 that at least equals the difference between the first amount and the second amount.

If the second data server 130 determines that the third amount of data stored at the first data file 112 equals or exceeds the difference between the first and second amounts, the second data server 130 may be configured to transmit a data request 138 to the first data server 110 over the pre-authorized secure connection to request for transfer of data from the first data file 112 that can over the difference between the first and second amounts and allow the second data server 130 to fulfil the data request 154. For example, the second data server 130 may be configured to include in the data request 138 a request to transmit a fourth amount of data from the first data file 112, wherein the requested fourth amount at least equals the difference between the first and second amounts. The fourth amount of data may correspond to a fourth number of data objects that at least equals the difference between the first and second number of data objects. In response to receiving the data request 138, the first data server 110 may be configured to transmit the requested fourth amount of data from the first data file 112 to the second data server 130 over the pre-authorized connection between the first and second data servers 110 and 130. In one embodiment, upon receiving the data request 138, the first data server 110 may be configured to search the pre-authorized server list 114 to check whether the second data server 130 is a pre-authorized data server and that the first data server 110 is pre-authorized (e.g., by user 152) to transmit data from the first data file 112 to the second data file 132 at the second data server 130. The first data server 110 may be configured to transmit the requested fourth amount of data to the second data server 130 when the second data server 130 is determined as a pre-authorized data server and that the first data server 110 is pre-authorized to transmit data from the first data file 112 to the second data file 132 at the second data server 130. User 152 may configure the fourth amount of data to be equal to the difference between the first and second amounts or higher than the difference between the first and second amounts.

In one or more embodiments, the first data server 110 may be configured to obtain authorization from the user 152 before transferring the fourth amount of data from the first data file 112 to the second data server 130. For example, upon receiving the data request 138 from the second data server 130, the first data server 110 may be configured to send a transfer alert 116 to the registered user device 150.

The transfer alert 116 may include an indication that the pre-authorized second data server 130 is requesting the fourth amount of data to be transferred from the first data file 112 to the pre-linked second data file 132. User 152 may authorize the data request 138 by using the user interface of the user device 150. In response to the user 152 authorizing the data request 138 using the user device 150, the user device 150 may be configured to transmit a transfer authorization 156 to the first data server 110 indicating that the data request 138 is authorized. The first data server 110 may transfer the requested fourth amount of data after receiving the transfer authorization 156 from the user device 150.

At step 214, the second data server 130 may be configured to receive the requested fourth amount of data from the first data server 110 and store the received data in the second data file 132. After receiving the fourth amount of data from the first data server 110, the second data file 132 may have sufficient data to fulfill the data request 154.

At step 216, the second data server 130 may process the data request 154 to transfer the requested first amount of data from the second data file 132 to the requested destination (e.g. another data file or device).

User device 150 may be capable of and configured to detect a geo-location (e.g., GPS coordinates) of the user device 150, and thus, a geo-location of the user wearing the user device 150, carrying the user device 150 or otherwise in the vicinity of the user device 150. User device 150 may be configured to determine a geo-location of the user device 150 according to a pre-determined schedule (e.g., periodically). User device 150 may be configured to regularly send geo-location data 158 (e.g., including the geo-location of the user device 150) to the first data server 110. The first data server 110 may be configured to receive the geo-location data 158 from the user device 150 and determine a geographical location of the user device 150. The first data server 110 may be configured to activate data transfer from the first data file 112 to the second data file 132 in response to detecting that the user device 150 is in the second geographical region of the second data server 130. As long as the user device 150 is not detected in the second geographical region, the first data server 110 may be configured to keep the data transfer from the first data file 112 to the second data file 132 inactive. This may significantly reduce the probability of potential data breaches at the first data server 110 and improve data security of the first data server 110.

In one or more embodiments, the second data server 130 may require the user 152 to maintain a minimum amount of data (e.g., minimum number of data objects) in the second data file 132, for example, to maintain privileged status of the user 152 and/or avoid additional fees to the user 152. Accordingly, the second data server 130 may be configured to detect when the amount of data in the second data file 132 (second amount of data from the above discussion) falls below a pre-selected threshold data amount (e.g., threshold number of data objects) needed, for example, to maintain the privileged status and/or avoid additional fees to the user 152. In response to determining that the second amount of data in the second data file 132 is below the threshold amount, the second data server 130 may be configured to determine an amount of data needed to bring the second data file 132 to the threshold amount of data. For example, the second data server 130 may be configured to determine a fifth amount of data (e.g., fifth number of data objects) as a difference between the threshold amount and the second amount currently stored in the second data file 132. The second data server 130 may be configured to request the first data server 110 to transfer the fifth amount of data from the first data file 112 to the second data server 130. The second data server 130 may request the fifth amount of data similar to how the second data server 130 requests the fourth amount of data from the first data server 110 as described above, including obtaining the third amount of data currently stored in the first data file 112, determining whether the third amount of data equals or exceeds the fifth amount of data needed to bring the second data file 132 up to the threshold amount, and requesting the fifth amount of data upon determining that the third amount of data in the first data file 112 equals or exceeds the fifth amount of data. The second data server 130 may be configured to receive the requested fifth amount of data from the first data server 110 and store in the second data file 132. The storing of the fifth amount of data to the second data file 132 may bring the second data file 132 up to the threshold amount, thus avoiding loss of privileged status of the user 152 and/or avoid additional fees to the user 152.

Figure 3:
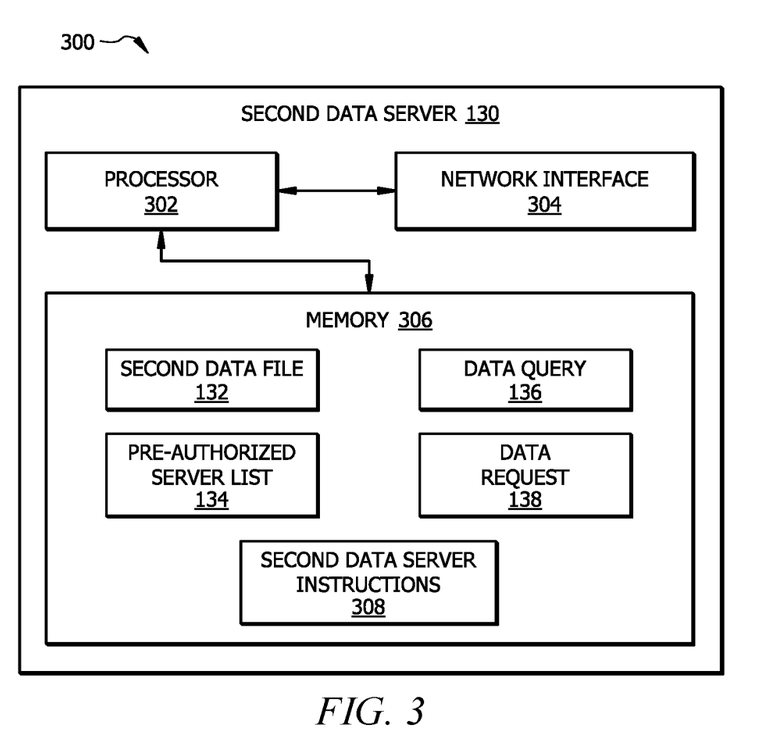
FIG. 3 illustrates an example schematic diagram of the second data server illustrated in FIG. 1, in accordance with one or more embodiments of the present disclosure.

FIG. 3 illustrates an example schematic diagram of the second data server 130 illustrated in FIG. 1, in accordance with one or more embodiments of the present disclosure.

Second data server 130 includes a processor 302, a memory 306, and a network interface 304. The second data server 130 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., second data server instructions 308) to implement the second data server 130. In this way, processor 302 may be a special-purpose computer designed to implement the functions disclosed herein. In one or more embodiments, the second data server 130 is implemented using logic units, FPGAs, ASICs, DSPs, or any other suitable hardware. The second data server 130 is configured to operate as described with reference to FIGS. 1-2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a readonly memory (ROM), random-access memory (RAM), ternary content-addressable memory (TCAM), dynamic random-access memory (DRAM), and static random-access memory (SRAM).

The memory 306 is operable to store second data file 132, pre-authorized server list 134, data query 136, data request 138 and the second data server instructions 308. The second data server instructions 308 may include any suitable set of instructions, logic, rules, or code operable to execute the second data server 130.

The network interface 304 is configured to enable wired and/or wireless communications. The network interface 304 is configured to communicate data between the second data server 130 and other devices, systems, or domains (e.g. first data server 110, user device 150 etc.). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the first data server 110 and the user device 150 may be implemented similar to the second data server. For example, the each of the first data server 110 and the user device 150 may include a processor and a memory storing instructions to implement the respective functionality of the first data server 110 and user device 150 when executed by the processor. The memory of the first data server 110 may further store the first data file 112, pre-authorized server list 114 and transfer alert 116. The memory of the user device may further store the data request 154, transfer authorization 156, geo-location data 158 and authentication request 160.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a first data server located in a first designated region and storing a first data file for a user;
a second data server located in a second designated region outside the first designated region and storing a second data file for the user, wherein a pre-authorized secure connection can be established between the first data server and the second data server;
wherein the second data server is configured to:
receive a request for a first amount of data from the second data file;
detect that the first amount of data is larger than a second amount of data stored in the second data file;
determine over the pre-authorized secure connection whether the first data file at the first data server includes a third amount of data that equals or exceeds a difference between the first amount and the second amount;
detect that the third amount of data in the first data file equals or exceeds the difference between the first amount and the second amount;
request the first data server over the pre-authorized connection to transmit a fourth amount of data from the first data file that at least equals the difference between the first amount and the second amount;
receiving the fourth amount of data from the first data server over the pre-authorized connection; and
in response to receiving the fourth amount of data, process the request for the first amount of data from the second data file.

2. The system of claim 1, wherein the first data server is configured to:
receive a query from the second data server over the pre-authorized connection for information relating to the third amount of data stored in the first data file; and
transmitting to the second data server, in response to receiving the query, the information relating to the third amount of data over the pre-authorized connection to the second data server.

3. The system of claim 2, wherein the second data server is configured to:
detect, based on the received information, that the third amount of data in the first data file equals or exceeds the difference between the first amount and the second amount.

4. The system of claim 1, wherein the first data server is further configured to:
transmit an alert that the second data server has requested the fourth amount of data from the first data file;
receive an authorization to transfer the fourth amount of data from the first data server to the second data server; and
in response, transmit the fourth amount of data to the second data server.

5. The system of claim 1, wherein the first data server is configured to:
receive a geo-location of a user device of the user registered with the first data server;
determine based on the geo-location that the user device is in the second designated region; and
in response, activate transfer of data from the first data file at the first data server to the second data server.

6. The system of claim 5, wherein the first data server is configured to setup the pre-authorized connection between the first data server and the second data server in response to determining that user device is in the second designated region.

7. The system of claim 1, wherein the second data server is further configured to:
   detect that the second amount of data stored in the second data file has dropped below a pre-selected threshold amount;
   determining a fifth amount of data as a difference between the threshold amount and the second amount of data stored in the second data file;
   requesting the first data server over the pre-authorized connection to transfer the fifth amount of data from the first data file;
   receiving the fifth amount of data from the first data server; and
   storing the received fifth amount of data in the second data file.

8. The system of claim 1, wherein the second data server is further configured to receive configuration to establish the pre-authorized connection with the first data server.

9. The system of claim 1, wherein the second data server is further configured to authenticate the request for the first amount of data based on a unique identity of a user requesting the first amount of data.

10. A method for operating a first data server, comprising:
    receiving a request for a first amount of data from a first data file stored at the first data server has been requested;
    detecting that the first amount of data is larger than a second amount of data stored in the first data file;
    determining over a pre-authorized secure connection with a second data server whether a second data file stored at the second data server includes a third amount of data that equals or exceeds a difference between the first amount and the second amount, wherein the first data server is located in a first designated region outside a second designated region in which the second data server is located;
    detecting that the third amount of data in the second data file equals or exceeds the difference between the first amount and the second amount;
    requesting the second data server over the pre-authorized connection to transmit a fourth amount of data from the second data file that at least equals the difference between the first amount and the second amount;
    receiving the fourth amount of data from the second data server over the pre-authorized connection; and
    in response to receiving the fourth amount of data, processing the request for the first amount of data from the first data file.

11. The method of claim 10, further comprising:
    transmitting a query to the second data server over the pre-authorized connection for information relating to the third amount of data stored in the second data file;
    receiving from the second data server, in response to transmitting the query, the information relating to the third amount of data over the pre-authorized connection; and
    detecting, based on the received information, that the third amount of data in the second data file equals or exceeds the difference between the first amount and the second amount.

12. The method of claim 10, further comprising:
    establishing the pre-authorized connection between the first data server and the second data server in response to detecting that the first amount of data is larger than the second amount of data stored in the first data file.

13. The method of claim 10, further comprising:
    detecting that the second amount of data stored in the first data file has dropped below a pre-selected threshold amount;
    determining a fifth amount of data as a difference between the threshold amount and the second amount of data stored in the first data file;
    requesting the second data server over the pre-authorized connection to transfer the fifth amount of data from the second data file;
    receiving the fifth amount of data from the second data server; and
    storing the received fifth amount of data in the first data file.

14. The method of claim 10, further comprising:
    transmitting a request to approve transfer of the fourth amount of data from the second data file to the first data server;
    in response, receiving an approval to transfer the fourth amount of data from the second data file to the first data server; and
    requesting the second data server to transmit a fourth amount of data from the second data file in response to receiving the authorization.

15. The method of claim 10, further comprising receiving a configuration to establish the pre-authorized connection with the second data server.

16. A first data server, comprising:
    at least one processor configured to:
      receive a request for a first amount of data from a first data file stored at the first data server has been requested;
      detect that the first amount of data is larger than a second amount of data stored in the first data file;
      determine over a pre-authorized secure connection with a second data server whether a second data file stored at the second data server includes a third amount of data that equals or exceeds a difference between the first amount and the second amount, wherein the first data server is located in a first designated region outside a second designated region in which the second data server is located;
      detect that the third amount of data in the second data file equals or exceeds the difference between the first amount and the second amount;
      request the second data server over the pre-authorized connection to transmit a fourth amount of data from the second data file that at least equals the difference between the first amount and the second amount;
      receive the fourth amount of data from the second data server over the pre-authorized connection; and
      in response to receiving the fourth amount of data, process the request for the first amount of data from the first data file; and
    a memory coupled to the at least one processor and configured to store the first data file.

17. The first data server of claim 16, wherein the at least one processor is further configured to:
    transmit a query to the second data server over the pre-authorized connection for information relating to the third amount of data stored in the second data file;
    receive from the second data server, in response to transmitting the query, the information relating to the third amount of data over the pre-authorized connection; and detect, based on the received information, that the third amount of data in the second data file equals or exceeds the difference between the first amount and the second amount.

18. The first data server of claim 16, wherein the at least one processor is further configured to:
   establish the pre-authorized connection between the first data server and the second data server in response to detecting that the first amount of data is larger than the second amount of data stored in the first data file.

19. The first data server of claim 16, wherein the at least one processor is further configured to:
   detect that the second amount of data stored in the first data file has dropped below a pre-selected threshold amount;
   determine a fifth amount of data as a difference between the threshold amount and the second amount of data stored in the first data file;
   request the second data server over the pre-authorized connection to transfer at least the fifth amount of data from the second data file;
   receive the at least fifth amount of data from the second data server; and
   store the received fifth amount of data in the first data file.

20. The first data server of claim 16, wherein the at least one processor is further configured to:
   transmit a request to approve transfer of the fourth amount of data from the second data file to the first data server;
   in response, receive an approval to transfer the fourth amount of data from the second data file to the first data server; and
   requesting the second data server to transmit a fourth amount of data from the second data file in response to receiving the authorization.

\* \* \* \* \*